3,646,104
METHOD FOR THE RING CLEAVAGE OF 2,6-DIOXIMINOCYCLOHEXANONE
Tucker T. Yee, Claymont, Del., assignor to Atlantic Richfield Company, New York, N.Y.
No Drawing. Filed July 3, 1969, Ser. No. 839,060
Int. Cl. C07c *121/02*
U.S. Cl. 260—465.4
4 Claims

ABSTRACT OF THE DISCLOSURE

Method for the ring cleavage of 2,6-dioximinocyclohexanone or the monosodium salt thereof to an ester of 5-cyano-2-oximinovaleric acid or an ester of 5-cyano-2-acetoximinovaleric acid utilizing acetic anhydride and a primary or secondary $C_1$–$C_5$ aliphatic alcohol at temperatures ranging from ambient to the reflux temperature of the reaction mixture in the absence of any catalyst.

BACKGROUND OF THE INVENTION

Field of the invention

This invention relates to a method for the production of cleavage products of 2,6-dioximinocyclohexanone or its monosodium salt which products are useful in the production of lysine, and in particular, this invention relates to a method for the ring cleavage of 2,6-dioximinocyclohexanone or the monosodium salt thereof by the use of acetic anhydride and a primary or secondary $C_1$ to $C_5$ aliphatic alcohol in the absence of any catalyst to produce the corresponding ester of 5-cyano-2-acetoximinovaleric acid or 5-cyano-2-oximinovaleric acid.

PRIOR ART

It is well known that the alpha-amino carboxylic acid, lysine, is an important component of animal and vegetable proteins. Because of its nutritional importance many attempts have been made to synthesize this compound. Two patents showing this synthesis are U.S. 2,999,875 (1961) to Ferris et al. and 3,059,018 to Johnson et al. (1962). In this synthesis cyclohexanone is nitrosated to give the 2,6-dioximinocyclohexanone if the nitrosation is carried out with methyl nitrite and hydrogen chloride. If, however, sodium nitrite and aqueous methanol is admixed with the cyclohexanone and glacial acetic acid is added slowly there will be formed the monosodium salt of the 2,6-dioximinocyclohexanone. In the aforementioned patents acylation of the dioximinocyclohexanone was carried out utilizing a variety of well known acylating agents such as the acid chlorides, sulfonyl chlorides and the like in the presence of an aqueous base or by the use of acetic anhydride and concentrated sulfuric acid. In the former case the acylation with attendent ring cleavage produces 5-cyano-2-oximinovaleric acid which, in turn, is converted to lysine by reduction. When using acetic anhydride and concentrated sulfuric acid there was produced the 2,6-diacetoximinocyclohexanone. The cleavage of the ring of this compound is then carried out, for example, by the use of sodium ethoxide in ethanol to give ethyl 5-cyano-2-oximinovalerate. The cleavage could also be accomplished by the use of sodium methoxide in benzene to give the methyl-2-acetoximino-5-cyanovalerate. These compounds on reduction and hydrolysis are converted to lysine.

These afore-mentioned patents also show acylation and ring cleavage with an acylating agent, an alcohol and a base. It was stated that a base was necessary in order to carry out the reaction without the formation of dicyano compounds which would be valueless for the purpose of producing lysine.

The present invention differs from the prior art cleavage process by the use of only acetic anhydride and a primary or secondary aliphatic alcohol having from 1 to 5 carbon atoms and no catalyst.

SUMMARY OF THE INVENTION

In accordance with this invention 2,6-dioximinocyclohexanone or the monosodium salt thereof is dissolved in an excess of a $C_1$ to $C_5$ primary or secondary aliphatic alcohol and acetic anhydride is added. The mixture is stirred for a few minutes at room temperature and thereafter can be heated to an elevated temperature, generally the reflux temperature of the mixture and refluxed from ½ to 6 hours, depending upon the alcohol employed. The products will be either the ester of 5-cyano-2-acetoxyaminovaleric acid or esters of 5-cyano-2-oximinovaleric acid depending upon the reactant materials.

It is an object of this invention therefore to provide a method for the ring cleavage of 2,6-dioximinocyclohexanone or the monosodium salt thereof.

It is another object of this invention to provide a method for the ring cleavage of 2,6-dioximinocyclohexanone or the monosodium salt thereof utilizing acetic anhydride and a primary or secondary $C_1$ to $C_5$ aliphatic alcohol.

Other objects of the invention will be apparent from the following description of the preferred embodiments and from the claims.

DESCRIPTION OF THE PREFERRED EMBODIMENTS

The preferred alcohols are the saturated monohydric alcohols having from 1 to 5 carbon atoms which may be primary or secondary, these include methanol, ethanol, 1-propanol, 2-propanol (isopropyl alcohol), 1-butanol, 2-butanol, 1-pentanol, 2-pentanol, and 3-pentanol. Acetic anhydride is preferred as the other reactant since it does not react with the alcohol so rapidly that the cleavage reaction is affected seriously. Tertiary alcohols are not preferred since they react too readily with the acetic anhydride to give the acid and an olefin.

The cleavage reaction can be carried out by dissolving the 2,6-dioximinocyclohexanone (or monosodium salt thereof) in the alcohol. It is preferable to use 2 or more moles of alcohol per mole of the 2,6-dioximinocyclohexanone since it not only enters into the reaction but is also a solvent. The acetic anhydride is then added to the alcohol solution at room temperature and stirred for from 5 to 10 minutes although this time is not critical merely being a function of mixing efficiency and thereafter the mixture is heated to a temperature in the range of 60° C. to the reflux temperature of the reactant solution. In general, reflux temperatures of the reaction are preferred when 2,6-dioximinocyclohexanone is the starting material. When the monosodium salt is used lower temperatures, i.e. between 25° C. and 60° C. can be used.

The reaction time is a function primarily of the particular reactants used. With the monosodium salt of 2,6-dioximinocyclohexanone times as short as ½ hour can be used together with the moderate temperatures mentioned. With the 2,6-dioximinocyclohexanone and methanol times up to 4 to 6 hours may be required since the reflux temperature of the reaction mixture is low. With the higher alcohols such as isopropyl alcohol or the $C_4$ and $C_5$ alcohols higher reflux temperatures are obtained and thus shorter times can be used, generally in the range of from 1 to 4 hours. Atmospheric pressures are preferred since superatmospheric pressures have been found to tend to give poorer yields and cause undesired side reactions.

In the case of methanol the reflux temperature at atmospheric pressure is approximately 66° C. and for the higher alcohols the reflux temperature is correspondingly higher. If desired, the acetic anhydride can be added to the 2,6-dioximinocyclohexanone and thereafter the alcohol added. It is not preferred, of course, to admix the acetic anhydride and the alcohol prior to adding them to the 2,6-dioximinocyclohexanone since they will react with each other to form esters and therefore will not be available to react with the 2,6-dioximinocyclohexanone.

It is preferred to use 1 to 2 moles of acetic anhydride per mole of 2,6-dioximinocyclohexanone and it is preferred to use 2 or more moles of the alcohol per mole of 2,6-dioximinocyclohexanone. An excess of both the acetic anhydride and the alcohol can be used if desired, but too large an excess merely adds to the cost of the process.

The cleavage product can be recovered by distilling off the excess alcohol until a syrupy solution is obtained from which the product can be crystallized by seeding with a sample of the product from a previous run. Crystallization of the syrupy solutions can be obtained without seeding but this method is slow and time consuming.

The following examples are provided to further illustrate the instant invention but these should not be construed as limiting the invention solely thereto.

EXAMPLE I

To a solution of 2.0 grams of 2,6-dioximinocyclohexanone in 200 ml. of absolute methanol was added 5.0 grams of acetic anhydride (3.8 molar equivalents) at 25° C. and stirred for 10 minutes. This mixture was then heated at reflux temperature for 5 hours. Removal of the methanol gave a viscous material, which on seeding with a few crystals of methyl-5-cyano-2-acetoximinovalerate and filtration gave 4.0 grams of methyl 5-cyano-2-acetoximinovalerate, M.P. 48° C. The viscous filtrate which after purification was identified as the methyl 5-cyano-oximinovalerate, M.P. 61–63° C. (0.8 gram). The overall yield was 77 weight percent based on the 2,6-dioximinocyclohexanone.

When the reaction was carried out with 2.0 grams of 2,6-dioximinocyclohexanone and 2 molar equivalents of acetic anhydride, a mixture of 88 weight percent yield based on the 2,6-dioximinocyclohexanone of methyl 5-cyano-2-acetoximinovalerate and 5-cyano-2-oximinovalerate was isolated.

EXAMPLE II

To a mixture of 2.0 grams of 2,6-dioximinocyclohexanone in 50 ml. of isopropanol was added 5.0 grams (3.8 molar equivalent) of acetic anhydride slowly. The mixture was warmed on a steam bath to 50–55° C. until all 2,6-dioximinocyclohexanone reacted and was then heated to reflux for 1½ hours. The resulting mixture was diluted with additional 100–200 ml. of isopropanol and then decolorized with activated charcoal. After removal of isopropanol by evaporation at reduced pressure and seeding with a few crystals of isopropyl 5-cyano-2-acetoximinovalerate there was obtained 2.8 grams (91.3 weight percent yield based on the 2,6-dioximinocyclohexanone) of isopropyl 5-cyano-2-acetoximinovalerate, M.P. 46–47° C.

Under similar conditions, the reactions with one and two molar equivalents of acetic anhydride gave the isopropyl 5-cyano-2-acetoximinovalerate in 45–50 weight percent yield and 72 weight percent yield respectively.

EXAMPLE III

The ring-opening reaction of the monosodium salt was carried out by a dropwise addition of 1.0 ml. of acetic anhydride to a suspension of 1.0 gram of the monosodium salt of 2,6-dioximinocyclohexanone in 10 ml. of absolute methanol at room temperature. The mixture on stirring became a colorless solution and the excess methanol was removed by evaporation. The viscous residue was treated with a small amount of water and then extracted with ethyl ether. The ethyl ether, after washing with dilute sodium bicarbonate and drying over anhydrous magnesium sulfate on evaporation gave a thick syrup, which on standing crystallized to give a white solid. After recrystallization from toluene, the methyl 5-cyano-2-oximinovalerate (M.P. 61–63° C.) was obtained.

EXAMPLE IV

To a suspension of 1.0 gram of the monosodium salt of 2,6-dioximinocyclohexanone in 50 ml. of isopropanol was added dropwise 4.0 ml. of acetic anhydride. The reaction mixture became exothermic and the temperature elevated to 30–35° C. The final mixture was then stirred for 30 minutes until it dropped to room temperature. The sodium acetate precipitated was then removed by filtration and the filtrate was evaporated in vacuo. The viscous residue was treated with a small amount of water and then extracted with ethyl ether. After a water washing and drying over anhydrous magnesium sulfate, the ethyl ether was removed by evaporation on a steam bath. The residue is a syrup-like material but on long standing and vigorous scratching gave a yellowish solid. After recrystallization from a mixture of toluene and cyclohexane, there was obtained 0.5 gram (42 percent) of white powdery isopropyl 5-cyano-2-acetoximinovalerate, M.P. 46–47° C.

EXAMPLE V

Similar reactions were carried out with $C_4$ alcohols including butanol-2 and the various $C_5$ alcohols including pentanol-1 and pentanol-2. In all cases ring cleavage was obtained with the $C_4$ and $C_5$ alcohols with excellent yields of the corresponding esters.

The ring cleavage products produced in accordance with this invention have been converted to lysine in accordance with the prior art process.

I claim:
1. The method for the ring cleavage of 2,6-dioximinocyclohexanone or the monosodium salt thereof by contacting said 2,6-dioximinocyclohexanone or the monosodium salt thereof solely with at least two moles per mole of said cyclohexanone or said salt of a primary or secondary saturated aliphatic monohydric alcohol having from 1 to 5 carbon atoms, and with acetic anhydride in an amount at least from about 1 to 2 moles of said anhydride per mole of said cyclohexanone or said salt at temperatures ranging between ambient and the reflux temperature of the reactant mixture for from ½ to 6 hours to produce the corresponding alcohol esters of 5-cyano-2-acetoxyaminovaleric acid and 5-cyano-2-oximinovaleric acid.

2. The method according to claim 1 wherein the contacting is carried out at temperatures ranging between 60° C. and the reflux temperature of the reactant mixture.

3. The method according to claim 1 wherein the alcohol is methanol.

4. The method according to claim 1 wherein the alcohol is isopropyl alcohol.

References Cited

UNITED STATES PATENTS

| | | | |
|---|---|---|---|
| 2,999,875 | 9/1961 | Ferris et al. | 260—465.4 |
| 3,031,490 | 4/1962 | Ferris et al. | 260—465.4 |
| 3,059,018 | 10/1962 | Johnson et al. | 260—465.4 |

JOSEPH P. BRUST, Primary Examiner